United States Patent [19]

Chestnut et al.

[11] Patent Number: 4,572,346

[45] Date of Patent: Feb. 25, 1986

[54] POWER PRESS RAM SAFETY GUARD WITH ELECTRICAL INTERLOCK

[75] Inventors: William R. Chestnut; Clive L. Parcell; Christopher J. Cox; David J. MacKenzie, all of Ottumwa, Iowa

[73] Assignee: Deere & Company, Moline, Ill.

[21] Appl. No.: 575,413

[22] Filed: Jan. 30, 1984

[51] Int. Cl.[4] .......................... F16D 71/04; F16P 1/00; B30B 15/28

[52] U.S. Cl. .......................................... 192/134; 72/2; 74/616; 100/53

[58] Field of Search ................ 192/134; 72/2; 74/613, 74/616; 100/53

[56] References Cited

U.S. PATENT DOCUMENTS

| | | | |
|---|---|---|---|
| 1,869,895 | 8/1932 | Hazenfield | 100/53 |
| 2,357,508 | 9/1944 | Ernst | 100/53 |
| 3,370,498 | 2/1968 | Persia et al. | 192/134 |

*Primary Examiner*—Alan Cohan

*Assistant Examiner*—John A. Rivell

[57] ABSTRACT

A power press is comprised of a frame, a stationary bed, a ram reciprocally movable toward and away from the bed and a safety guard for preventing movement of the ram toward the ram when the tooling for the press must be repaired or changed. The guard includes a first chain attached to the frame of the press and a second chain attached to the ram and attachable to the first chain to restrict movement of the ram toward the bed. The chains are connectable together at a plurality of locations to enable the combined, attached length of the chains to be adjusted. The adjustability permits the guard to be easily used with a press having a range of shut heights. A normally open power circuit controls the reciprocal movement of the ram. A key for closing the circuit by engagement with a receptacle in the circuit is attached to the first chain. The key is engageable with the receptacle when the chains are unattached and is not engageable with the receptacle when the chains are attached.

9 Claims, 2 Drawing Figures

POWER PRESS RAM SAFETY GUARD WITH ELECTRICAL INTERLOCK

BACKGROUND OF THE INVENTION

This invention relates to a power press and more particularly to a safety guard for preventing accidental movement of the reciprocally movable press ram or platen. Platen presses operate under high energy for stamping, forming or trimming operations and are a cause of injury to the hands and/or arms of the operator if the work area between the platens is not clear prior to actuation of the press. OSHA and ANSI standards dictate that power press operators be protected against a deadfall (i.e. a free-fall of the ram) or an accidental trip of the press when changing or repairing dies or other tooling in a power press. In the past, the most common safety procedure has been to use metal safety blocks of, for example, magnesium, aluminum of light weight alloys of such metals. The blocks are made in a range of sizes from about 4 to 24 inches. The blocks are inserted into the open area of the press between the die bed or plate and the upper movable platen or ram of the press when tooling in the press is changed or repaired. However, proper utilization of safety blocks is at best difficult to monitor and is expensive to implement and maintain. One difficulty is that manufacturing processes require presses individually and collectively to have a wide range of press shut heights or openings. ("Press shut height" is the height of the reciprocally movable ram above the press bed at the lowest point of the ram movement cycle.) To properly guard presses with openings of variable heights, it has been necessary (1) to make time consuming ram adjustments to make safety blocks fit, (2) to have available several varying heights of expensive safety blocks which are attachable together to form a variety of composite heights or (3) to design subbases for all dies and tooling to standardize press shut heights.

Still another problem is that in many cases the use of safety blocks restricts access to the work area in the press opening and limits the size and configuration of dies that can be placed in a press while maintaining proper guarding for the operator.

Lastly, when the operator cannot be adequately protected, the tooling must be removed from the press for repair. This is, of course, burdensome.

SUMMARY OF THE INVENTION

It is an object of the invention to provide an improved safety guard for a press which does not obstruct the press work area.

Another object of the invention is to provide a guard system which is adjustable for a range of shut heights.

Another object is to provide a safety guard which is simple to install and can be modified for use on a wide variety of power press designs.

Another object of the invention is to provide a safety guard which is easy to store and maintain between uses.

Another object of the invention is to provide a safety guard which is easy to use and requires limited time to engage and disengage.

Still another object of the invention is to provide a safety guard which provides greater manufacturing capability by permitting the entire machine bed to be used for the manufacturing process and by avoiding the need of building dies and tooling layouts which must be compatible with the placement of prior art machine safety blocks.

These and other objects of the invention are accomplished in a power operated machine comprising a frame, a stationary work bed, a movable member reciprocally movable on the frame toward and away from the bed and at least one safety guard for preventing movement of the movable member toward the bed. In accordance with the features of this invention, the safety guard includes a first member fixed to the machine frame, a second member fixed to the movable member and attachable to the first member for restricting movement of the movable member toward the bed. The first and second members are connectable together by an attaching means at a plurality of locations for enabling adjustment of the combined, attached length of the first and second members. The adjustability permits the guard to be easily used with a single press having a wide variety of shut heights as well as with a plurality of presses having a wide range of shut heights.

In accordance with another feature, the guard further comprises a normally open electrical circuit for controlling the reciprocal movement of the movable member and a key for closing the circuit by engagement with a receptacle in the circuit. The key, which is attached to the first member, is engagable with the receptacle when the first and second members are unattached and is not engageable with the receptacle when the first and second members are attached.

Preferably the safety guard is located on a sidewall of the press frame. The first chain is attached to the sidewall at a location above the bed. The second chain is attached to the movable member. The switch is located on the frame sidewall at a location spaced from the point of attachment of the first chain to the frame. As a result, the work area and machine bed are left totally unobstructed by the safety guard. Also, the safety guard is adjustable for a range of shut heights, is easily and quickly engaged and disengaged, is adaptable to a variety of power press configurations and does not affect the design of die or tool layouts for compatibility with the safety guard.

The objects of the invention are further accomplished by a method for securing a power operated press against the accidental movement of the press ram toward the press bed. The method comprises the step of attaching together a first member connected to a frame of the press and a second member attached to the ram. The first and second members are connectable together at one of a plurality of locations determined by the spacing between the ram and the bed. This permits the method to be practiced with a press having a plurality of shut heights.

In accordance with still another feature, the method further comprises the step of removing a key connected to the first member from a receptacle in normally open circuit for controlling the reciprocal movement of the ram. The attachment of the first and second members together prevents engagement of the key with the receptacle. This requires the operator to disconnect the first and second members before closing the circuit by engagement of the key with the receptacle to energize the ram for operation.

DESCRIPTION OF THE PREFERRED EMBODIMENT

Figure 1:
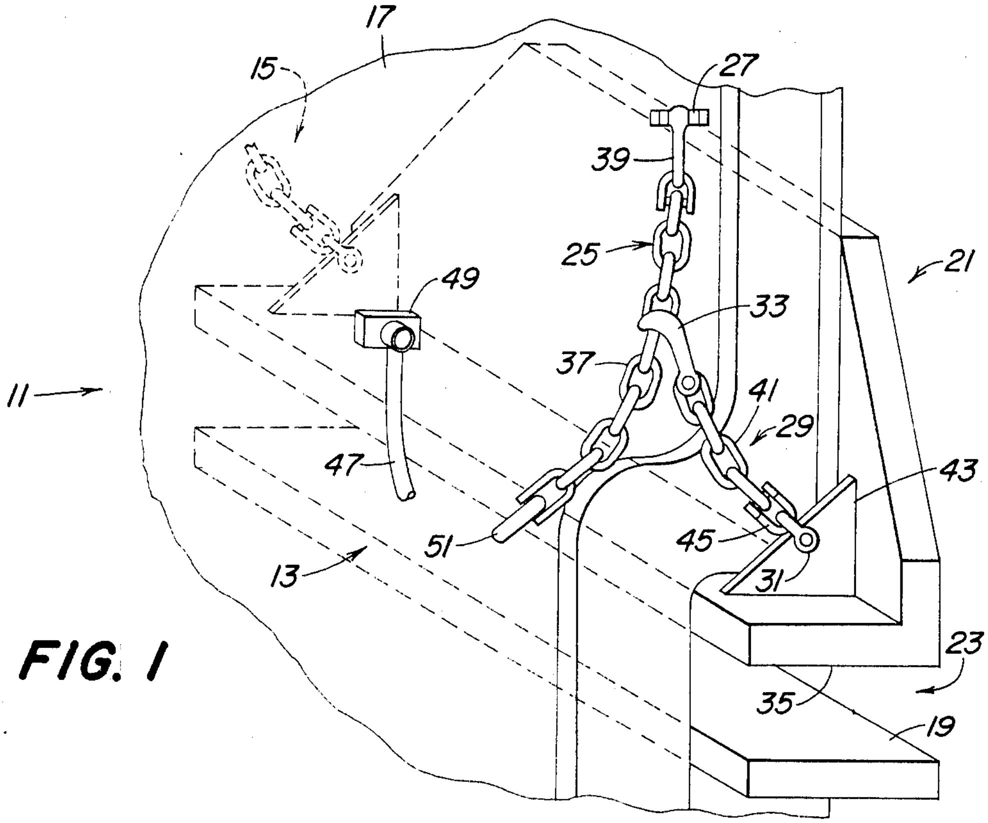
FIG. 1 is a fragmentary perspective view of a press in accordance with the features of this invention illustrating a pair of safety guards in the engaged position.
Figure 2:
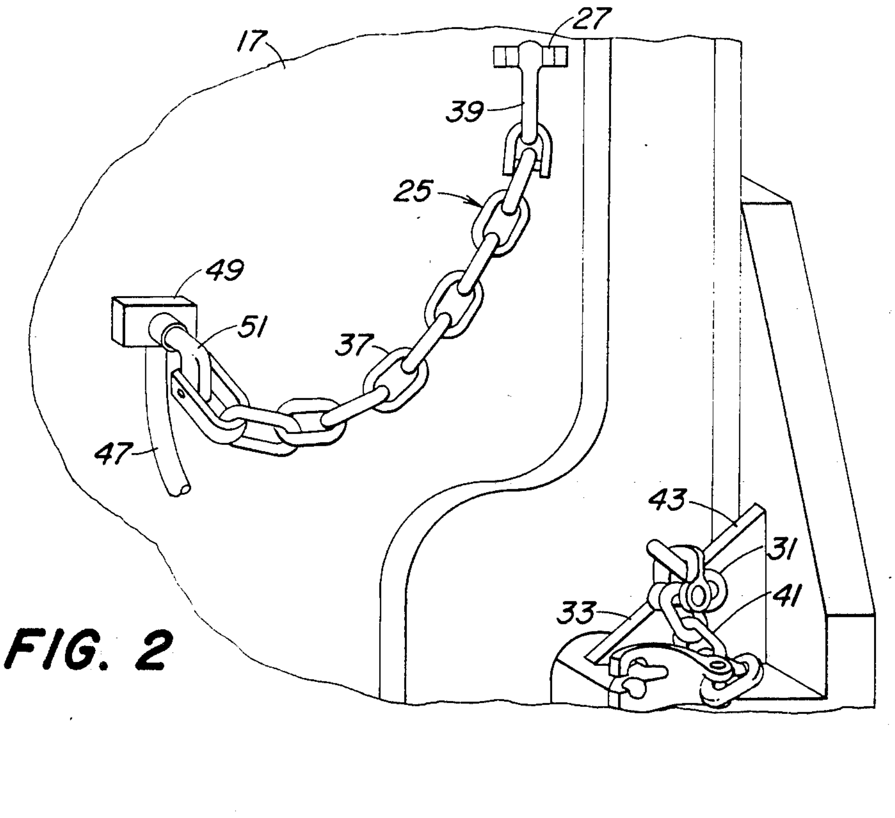
FIG. 2 is a fragmentary, perspective view of the power press shown in FIG. 1 except that the safety guards are shown in the disengaged position.

Reference is now made to FIGS. 1 and 2 which illustrate a mechanical power press 11 in accordance with a preferred embodiment of the invention. Press 11 is conventional, except for one or more symmetrically located guards for preventing accidental operation of the press. In this embodiment, a pair of safety guards 13, 15 is used. The number of guards may be varied according to the size of the press. Press 11 comprises an upright frame 17, a stationary bed or platen 19 at a lower portion of frame 17 and a reciprocally movable member or ram 21. The electrically powered mechanical drive for reciprocally moving ram 21 toward and away from bed 19 is not illustrated for simplicity. In addition, for simplicity, the illustration of tooling in a work area 23 between bed 19 and ram 21 is omitted.

Safety guards 13, 15 are identical and for convenience, only one will be described in detail. In accordance with the features of this invention, safety guard 13 comprises a first elongate member 25 having one end fixed to frame 17 at a first location 27 above the working area 23 of ram 21 and a second elongate member 29 having one end fixed to movable member or ram 21 at a second location 31. Member 29 is attachable to the first member 25 to restrict movement of ram 21 toward bed 19 by an attaching means 33 defining another end of the member 29 and being couplable at a plurality of locations, along the length of the member 29 to enable the combined, attached or effective length of the first and second members 25, 29 to be adjusted to accommodate a plurality of shut heights or press openings. The shut height is the spacing between a ram plate 35 and bed 19 at the lowermost position of the reciprocating movement of ram 21. The shut height of press 11 may be adjusted for accommodating different manufacturing jobs to be performed by the press.

In accordance with a preferred embodiment, first member 25 is comprised of a length of chain 37 connected to a sidewall of press frame 17 with a load centering eyebolt 39. Second member 29 is comprised of a second length of chain 41 connected to a gusset 43 of ram 21 with a screw pin shackle 45. The means for attaching chains 37, 41 is preferably a claw hook 33 connected to one end of chain 41 and anchorable to chain 37 at a plurality of locations along the length of chain 37. First and second members 25, 29 are preferably comprised of chains for simplicity and low cost. However, it will be appreciated that other members such as wire rope, rods or other alloy steel components with appropriate attachment means may be utilized.

In accordance with another feature of this invention, guard 13 further includes a normally open circuit 47 for controlling the energization of press 11 and in particular the reciprocal movement of ram 21. Circuit 47 is closable by inserting a key 51 attached to one end of chain 37 into a receptacle 49 of circuit 47. Key 51 is engageable with receptable 49 when first and second members 25, 29 are unattached as shown in FIG. 2 and is not engageable with receptacle 49 when members 25, 29 are attached as shown in FIG. 1. As a result, when guard 13 is engaged, ram 21 cannot be operated.

In the preferred embodiment, receptacle 49 includes a pair of spaced contacts (not shown). Key 51 is constituted by a plug having a conductor for bridging the contacts and closing circuit 47 when inserted into receptacle 49. Other equivalent switching mechanisms for circuit 47 such as a normally open switch and actuator may be substituted for receptacle 49 and key 51, respectively.

OPERATION

In accordance with the method for using the guards 13, 15 for securing the power operated press 11 against accidental movement of ram 21 toward bed 19, for example, when it is necessary to change or repair the tooling in work area 23, an operator performs the following steps. The steps for using guards 13, 15 are identical and therefore the description herein is limited to guard 13 for brevity. First, key 51 connected to first member 25 is removed from receptacle 49 of normally open power circuit 47 for controlling the reciprocal movement of the ram. This disconnects all power to press 11 and prevents the accidental tripping of ram 21 while changes are being made in work area 23. Secondly, first and second members 25, 29 are attached together at one of a plurality of positions determined by the spacing between ram plate 35 and bed 19. Safety guard 13 may be engaged when ram 21 is in any one of the plurality of positions at which ram 21 may be located. For example, the ram may be located at any location in its reciprocal movement cycle toward and away from bed 19. In addition, the shut height of ram 21 is adjustable to vary the spacing between ram plate 35 and bed 19 at the lowermost point of the reciprocal movement cycle of ram 21.

When first and second members 25, 29 are connected together, engagement of key 51 with receptacle 49 is not possible which prevents accidental operation of ram 21. Also, guards 13, 15 prevent movement of ram 21 toward bed 19 caused by a deadfall (i.e. free-fall) of ram 21. A deadfall may occur due to a fracture or component failure of the reciprocal drive mechanism (not shown) for ram 21.

When tooling changes or repairs are completed, members 25, 29 are disengaged and key 51 is engaged in receptacle 49. Press 11 is again ready for operation.

In accordance with features of this invention, it will be apparent that safety guards as described herein are easy to use, store and maintain; require little time for engagement and disengagement; are readily adjustable and adaptable to a variety of press configurations and require limited operator expertise. In addition, the work area 23 is unobstructed by the safety guards 13, 15. Thus, it is now unnecessary to build dies or tooling layouts which must accommodate the placement of machine safety blocks.

The invention has been described in accordance with a preferred embodiment thereof. It will be recognized by those skilled in the art that the preferred embodiment is subject to many modifications and variations. For example, safety guards 13, 15 are equally well utilized with other types of presses such as fully electrical or hydraulically powered presses. In addition, safety guards 13, 15 are also adaptable to any press which has a reciprocally movable member with potential energy. Other modifications will be apparent to those skilled in the art. Accordingly, it is intended that all such variations and modifications which are within the true spirit and scope of this invention be comprehended within the scope of the appended claims.

We claim:

1. In a power operated machine comprising a frame, a stationary work bed on said frame, a movable member reciprocable relative to said frame toward and away from said bed and at least one guard for selectively preventing movement of the movable member toward said bed, the improvement wherein said guard comprises:

a first elongate safety member having a first end fixed to said frame;

a second elongate safety member having a first end fixed to said movable member; attaching means forming a second end of said second safety member and being selectively attachable to said first safety member, when the movable member is in a position away from said bed such that the first and second safety members are a combined effective length operative for restricting movement of said movable member toward said bed.

2. The machine of claim 1 wherein said first safety member includes surface means along its length cooperating with said attaching means for attaching said first and second members together at a plurality of locations for adjusting the combined, effective length of said first and second safety members.

3. The machine of claim 1 wherein said guard further comprises:

a normally open circuit for controlling the reciprocal movement of said movable member, said circuit including a receptacle; and a key for engaging said receptacle to close said circuit, said key being attached to said first safety member and engageable with said receptacle when said first and second safety members are unattached from each other and not engageable with said receptacle when said first and second safety members are attached to each other.

4. The machine of claim 1 wherein:

said first and second members are first and second chains, respectively; and said attaching means is a hook connected to said second chain and selectively anchorable to said first chain at a plurality of locations defined by the links of said first chain.

5. The machine of claim 3 wherein:

said frame is upright;

said movable member is located above said stationary bed and is movable downwardly toward and upwardly away from said bed;

said frame comprises a sidewall;

said first safety member is attached to said sidewall at a first location above said bed; and said receptacle is located on said sidewall at a second location spaced from said first location.

6. In a method for securing a power operated press, including a control circuit, against the accidental movement of a ram of the press toward a bed of the press comprising the steps of (a) moving the ram away from said bed; (b) attaching together a first safety member connected to a frame of said press and a second safety member attached to the ram of said press; and (c) opening said circuit by removing a key, connected to said second safety member, from a receptacle in a normally open power circuit for controlling the reciprocal movement of the ram.

7. The method of claim 6 wherein said first and second members are connected together at one of a plurality of positions determined by the spacing between the ram and the bed.

8. The method of claim 6 further comprising the step of restricting engagement of said key with said receptacle when said first and second members are attached together.

9. The method of claim 6 wherein attachment of said first and second members together prevents engagement of the key with the receptacle.

* * * * *